United States Patent [19]

Uedaira et al.

[11] 4,434,202
[45] Feb. 28, 1984

[54] SLIDE MEMBER

[75] Inventors: Satoru Uedaira; Hidetoshi Shimizu; Hidemasa Tamura; Hiromichi Taguchi; Hiroshi Yamanoi; Yoshimi Makino, all of Yokohama, Japan

[73] Assignee: Sony Corporation, Tokyo, Japan

[21] Appl. No.: 323,457

[22] Filed: Nov. 20, 1981

[30] Foreign Application Priority Data

Nov. 29, 1980 [JP] Japan ................ 55-168190

[51] Int. Cl.³ .................. B32B 27/20; B32B 27/36
[52] U.S. Cl. ................... 428/143; 428/323; 428/325; 428/329; 428/330; 428/331; 428/482; 428/480
[58] Field of Search ............. 428/141, 143, 323, 325, 428/329, 330, 331, 480, 482

[56] References Cited

U.S. PATENT DOCUMENTS 4,364,985 12/1982 Tokuyama et al. ............ 428/143

Primary Examiner—Paul J. Thibodeau
Attorney, Agent, or Firm—Hill, Van Santen, Steadman & Simpson

[57] ABSTRACT

The slide member is composed of a polymer composite material containing an unsaturated polyester resin, a thermoplastic resin and a granular inorganic filler. The slide member is of a double construction the surface of which is removed so as to expose part of the surface of the inorganic filler.

The slide member thus constructed has particularly a favorable tape travelling property because it has a low friction coefficient, as well as the favorable properties inherent in the polymer composite material.

7 Claims, 15 Drawing Figures

SLIDE MEMBER

BACKGROUND OF THE INVENTION

1. Field of the Invention

The present invention relates to a slide member suitable particularly for an element on which a magnetic recording medium runs, such as drum member, head mold member, tape guide member or the like.

2. Brief Description of the Prior Art

The slide member of this type requires a wide range of characteristic properties with respect to abrasion, abrasion performance, antistatic properties, thermal expansion, dimensional accuracy, tape travel and so on so that processed metal materials or composite materials such as so-called bulk molding materials (BMC) comprising mainly a low shrinkable unsaturated polyester resin are employed as materials therefor.

Although the composite materials contain the unsaturated polyester resin and a suitable thermoplastic resin, a filler to be employed therefor is mainly glass fibers so that the orientation of the glass fibers may cause an anisotropy with respect to the thermal expansion coefficient of the composite materials, whereby the application thereof to precision mechanism parts requiring high dimensional accuracy is rendered difficult. Furthermore, the anisotropy resulting from the orientation of the glass fibers in the composite materials also may cause a large variation in mechanical strengths of the molded product produced from such composite materials. In instances where the composite materials are employed as drum materials or the like, the edges of the glass fibers contained therein come into contact with a magnetic tape and give an injury or damage on the surface of the magnetic tape, thereby leading to a situation where the tape can no longer be employed.

In order to overcome the drawbacks resulting from conventional materials, it has been proposed in our copending Japanese Patent Application No. 144,230/1977 (Early Publication No. 76,692/1979) and No. 164,080/1978 (Early Publication No. 89,316/1980) that a predetermined quantity of a granular inorganic filler is employed as a filler for unsaturated polyester resin composition. These unsaturated polyester resin compositions permit a favorable contact with a magnetic tape so that an injury or damage on the tape can be prevented and a wear is improved to a remarkable extent. The presence of the granular inorganic filler can also serve as improving the mechanical strength of the molded products resulting from the composition, reducing a shrinking ratio, and improving a dimensional accuracy upon molding. In instances where graphite is further added thereto in a predetermined amount, desired degrees of conductivity and lubricating properties are provided. These unsaturated polyester resin compositions are accordingly suitable particularly as materials for molded precision products and, more specifically, can be employed preferably for a slide member requiring a wide range of characteristic properties.

Although it is to be noted that the unsaturated polyester resin compositions possess favorable characteristics as hereinbefore mentioned, it has now been found that, where they are molded into slide members, there is still a room for improvement in tape travelling properties.

OBJECTS AND SUMMARY OF THE INVENTION

Therefore, it is an object of the present invention to provide a slide member having an improved tape travelling property.

Another object of the present invention is to provide a slide member possessing the characteristic properties inherent in an unsaturated polyester resin composition from which the slide member is produced.

A further object of the present invention is to provide a slide member in which part of granular inorganic fillers contained therein is exposed so as to come into contact with a magnetic recording medium running thereon, whereby a friction coefficient of the slide member is remarkably improved.

In accordance with one aspect of the present invention, there is provided a slide member in which the slide member is constructed so as to expose part of the granular inorganic filler on the surface thereof.

DETAILED DESCRIPTION OF THE PREFERRED EMBODIMENTS

Figure 1:
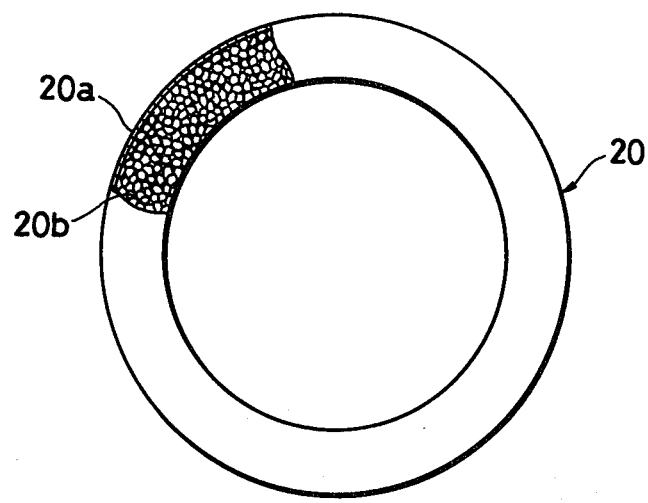
FIG. 1 is a cross sectional view illustrating a slide member in which a skin layer is present over a layer of a granular inorganic filler.

The slide member in accordance with the present invention comprises a polymer composite material and is constructed such that the skin layer consisting predominantly of an unsaturated polyester resin composition is removed so as to expose part of inorganic filler granules contained therein.

The resin components constituting a base for the composite material comprise the unsaturated polyester resin and a thermoplastic resin. These resins are usually compounded with each other by dissolving them in a polymeric monomeric cross-linking agent for the unsaturated polyester resin. The amount of the unsaturated polyester may be in the range from approximately 20 to 70% by volume, preferably from approximately 30 to 50% by volume. The amount of the thermoplastic resin may be in the range from approximately 1 to 25% by volume, preferably from approximately 5 to 20% by volume. The amount of the polymeric monomer is preferably from approximately 30 to 70% by volume, more preferably from approximately 40 to 60% by volume.

Although the amount of the resin components may vary with the amount of the granular inorganic filler which will be described in detail hereinafter, it may range from approximately 35 to 60% by volume, preferably from approximately 40 to 50% by volume.

The unsaturated polyester resins to be employed in accordance with the present invention may be produced, for example, by condensing alpha, beta-ethylenic unsaturated dicarboxylic acid, an anhydride thereof or a mixture thereof with a polyhydric alcohol or a mixture thereof or by dissolving in a copolymeric monomer a usual unsaturated alkyd such as a compound resulting from the ring cleavage of the corresponding alkylene oxide. It is to be noted throughout the specification that the term "dicarboxylic acid" is intended to include an anhydride of the dicarboxylic acid and a mixture thereof unless otherwise noted.

Although preferred representatives of the unsaturated dicarboxylic acids may include, for example, maleic acid, itaconic acid and fumaric acid, citraconic acid, chloromaleic acid and those equivalent thereto may also be employed It is also possible to employ a mixture thereof with a small amount of saturated dicarboxylic acids up to about 25 mol %. Examples of such saturated carboxylic acids may include phthalic acid, isophthalic acid, terephthalic acid, tetrahydrophthalic acid anhydride, succinic acid, adipic acid, sebacic acid, methylsuccinic acid or any dicarboxylic acid equivalent thereto. However, it is preferred to use an unsaturated dicarboxylic acid for all the dicarboxylic acid components in the polyester resins to be employed for the present invention because the maximum cross-link potential of such polyester plays an important role in the properties of the three-component resin composition.

The polyhydric alcohols to be useful for the preparation of the polyester may include, for example, a glycol such as 1,2-propanediol, dipropylene glycol, ethylene glycol, diethylene glycol, 1,3-butanediol, neopentyl glycol or the like; a triol such as trimethylolethane, trimethylolpropane, hexanetriol, pentaerythritol or the like; or any polyol equivalent thereto.

The unsaturated linear polyesters useful for the composition to be employed in the present invention may preferably be a polyester of the three-component system, in which fumaric acid or maleic acid is contained as a base therefor. Suitable examples of the unsaturated polyesters may be, for example, products obtainable by the polycondensation of (i) propylene glycol and maleic acid or fumaric acid; (ii) 1,3-butanediol and maleic acid or fumaric acid; (iii) ethylene glycol, propylene glycol (in an amount of approximately 50 mol % or less), and maleic acid or fumaric acid; (iv) propylene glycol, dipropylene glycol (in an amount of 50 mol % or less), and maleic acid or fumaric acid; and (v) diethylene glycol and maleic acid or fumaric acid. It is generally useful for the purpose of the present invention to use the unsaturated polyesters which are condensed up to the acid number of about 100 or less, preferably up to about 70 or less. The molecular weight of polymerizable polyesters may vary in a wide range from about 500 to 5,000, preferably from about 700 to 2,000.

The thermoplastic resins to be compounded with the unsaturated polyester resins in the composite materials to be employed for the present invention may be any thermoplastic polymer derived from a material, or a mixture thereof, which can provide a low shrinkability upon molding and preferably has a polymerizable reactive group represented by the moiety: $CH_2=C=$. The thermoplastic resins to be employed in accordance with the invention may include, for example, a homopolymer such as acrylates, e.g., methyl acrylate, ethyl acrylate or the like; methacrylates, e.g., methyl methacrylate, ethyl methacrylate, butyl methacrylate or the like; copolymers obtainable between the methacrylate and a lower alkyl ester of acrylic acid or methacrylic acid; copolymers of the methacrylate with one or more than one of the following: methacrylic acid, a higher alkyl ester of acrylic or methacrylic acid such as lauryl methacrylate, cetylstearyl methacrylate, 2-ethylhexyl acrylate or the like, a hydroxylalkyl methacrylate such as hydroxyethyl methacrylate or the like, an alicylic ester of acrylic or methacrylic acid such as isobornyl methacrylate or the like, an acrylamide or methacrylamide such as acrylamide, methacrylamide, methylolacrylamide or the like, an aromatic compound such as styrene or the like, a nitrile compound such as acrylonitrile or the like, styrene-acrylonitrile copolymer, vinyl chloride-vinyl acetate copolymer, cellulose derivative such as cellulose acetate butylate, cellulose acetate propionate or the like, and so on. Saturated polyester resins, vinyl chloride resins, vinyl acetate resins or the like or a mixture thereof or a mixture thereof with other resins as hereinbefore set forth may also be employed as the thermoplastic resins. The thermoplastic copolymers to be employed for the invention may be one having a molecular weight ranging from approximately 10,000 to 10,000,000, preferably from approximately 25,000 to 500,000.

The thermoplastic polymers may be a mixture in a liquid form compatible in a monomer solution with the unsaturated polyester or in any other form. Although there is a tendency that the mixture is allowed to separate into two liquid phases when placed for a long period of time, it may be practicable to use such mixture, when in the two phases, by thoroughly mixing the two phases immediately prior to the use of the resins for the premix or preform molding method. In order to provide a low shrinkability or expansion when the three-component liquid compositions in accordance with the present invention, irregardless of whether or not they are compatible or miscible, is cured under heat and pressure, the cured product still should be or be rendered immiscible. The "gross immiscibility" of the cured product may be determined as a situation where there is seen a clear two-phase structure formed in such a manner that, typically speaking, white or grayish white spherical materials are dispersed in a matrix when observed on a sample by a reflecting light at a magnifying power of higher than 40.

The monomers as solvents or cross-linking agents for the unsaturated polyesters and the thermoplastic resins may be a liquid monomeric material or a mixture thereof, which possess at least one polymerizable reactive group represented by the moiety: $CH_2=C=$, per molecule. The liquid monomeric material should be copolymerizable with the unsaturated polyesters and form a cross-linked or thermally cured structure therewith. They also should have the ability to dissolve both the unsaturated polyesters and the thermoplastic resins over a wide range of concentrations. The monomers to be employed singly or in admixture in an amount of less than about 50% by volume may include, for example, a lower alkyl ester of acrylic acid or methacrylic acid, chlorostyrene, 1,3-butanediol dimethacrylate, a mixture of styrene with diallyl phthalate or an equivalent thereof, vinyltoluene or the like. The amount of the liquid monomer may range from about 30 to 70% by volume, preferably from about 40 to 60% by volume, based on the weight of the resin composition.

In instances where the resin compositions to be employed in the invention are cured, a polymerization initiator may be added. Suitable polymerization initiators may include, for example, a peroxide such as benzoyl peroxide, tert.-butyl peroctoate, di-tert.-butyl perbenzoate, cyclohexanone peroxide, di-tert.-butyl peroxide or the like. The polymerization initiator may be preferably added to the reaction system immediately prior to the polymerization operation. The amount of the polymerization initiator is such that the resin composition may be maintained in a liquid form for a period of time required for the operation. The effective concentration of the initiator may range from about 0.1 to 3% based on the three-component resin composition. The curing of the composition may be effected typically in a closed system, preferably in a mold, under the application of heat and a pressure. A polymerization regulator, a viscosity increasing agent or a releasing agent may also be added to the composition as well have been understood in the art.

The granular inorganic filler to be employed with the polymer composite material in accordance with the present invention functions as enforcing the resin compositions and is required for providing the slide member resulting therefrom with a low shrinkability and a high dimensional accuracy. As the slide member according to the invention is usually employed for running a magnetic recording medium thereon, it is preferred that the inorganic filler is non-magnetic and may include, for example, a non-magnetic inorganic filler such as glass beads, ferrites, e.g., Zn ferrite or the like, calcium carbonate, barium sulfate, aluminum hydroxide, magnesium carbonate, alumina, titanium white, clay, silica, talc or the like, or a mixture thereof. Where glass beads are employed as the inorganic filler, it is preferred to use glass beads with their surfaces coated with a silane coupling agent and having an average particle size ranging from approximately 30 to 100 microns, more preferably from approximately 40 to 50 microns. Where calcium carbonate particles are employed as the inorganic filler, the average particle size of the calcium carbonate may be in the order of several microns. Generally, particle sizes of the inorganic fillers may range from approximately 1 to 100 microns. Where the particle size is too small, it is hard to prepare a homogeneous mixture of such small size particles; where the particle size is too large, it rather impairs a dimensional accuracy for the molded product resulting therefrom. In order to provide a small shrinkability, it is preferred to use the inorganic filler as small in particle size as possible within the specified scope as hereinbefore mentioned.

The amount of the granular inorganic filler may be in the range of approximately 40 to 65% by volume, preferably from approximately 50 to 60% by volume, based on the volume of the resin composition. If the amount of the granular inorganic filler is too small, the composite material containing it cannot be molded into desired shapes of slide members. If the amount of the inorganic filler is too large, the strength of the slide member is rendered so irregular that a desired performance cannot be provided. By determining a suitable kind and amount of the inorganic filler to be employed, the specific gravity of the molded product resulting from the resin composition can be changed so as to give a desired value, and the performance and appearance also can be varied.

A solid material such as graphite, carbon black, molybdenum disulfide, polyethylene powders, graphite fluoride, Teflon (registered trade mark) powders or the like may also be added to the resin composition to provide a conductivity and/or lubricity. Generally, one or more than one of them may be used preferably in the amount of less than about 15% by volume of the amount of the resin composition as a substitute for the granular inorganic filler. Where the amount of these materials is too small, the desired effect cannot be obtained. Where the amount thereof is too large, the molded product resulting from such resin composition is rendered so soft that a wear is impaired. In particular, where graphite is employed to provide the resin composition with a conductivity, for example, a resistivity of less than $10^8$ ohms-cm and reduce a friction coefficient, the amount thereof ranges desirably from approximately 5 to 15% by volume. Where the amount thereof is too small, the desired effect, that is, the resistivity of less than about $10^8$ ohms-cm cannot be given. Where the amount thereof is too large, there is a risk that a mold is so seized that a release of the product from the mold encounters with a difficulty and that the resin composition, when molded into the slide member, is rendered so soft that an amount of wear is increased. The particle sizes of graphite may be in the range from about 15 to 100 microns. Carbon fibers may also be employed as a substitute for a part of the graphite to be added.

In order to enhance a fire retardance of the slide member according to the present invention, there may also be added a fire retardant such as $Al(OH)_3$ in an amount of, for example, about 5 to 15% by volume.

The resin compositions containing the polymer composite materials to be employed for the present invention may be prepared, for example, by adding the granular inorganic filler such as glass beads, graphite or the like and the polymerization initiator and, optionally, the releasing agent and/or the viscosity increasing agent to a solution of the composite material containing as a major component the unsaturated polyester resin and subjecting the mixture to the thermal curing in a mold. In the curing, the usual compression molding method, the transfer molding method, injection molding method and any other conventional molding method can be adopted. A so-called insert molding method as will be mentioned hereinafter can also be adopted to increase a dimensional accuracy for the molded product resulting therefrom.

The slide members in accordance with the present invention are suitable for use as precision mechanism parts requiring particularly a high dimensional accuracy, such as head drum members of video tape recorders, head mold members of tape recorders and tape guide members. Where such slide members are prepared from the polymer composite materials such as the composite material (BMC) consisting mainly of the low shrinkable unsaturated polyester resins, the resulting slide members allow a few percents of shrinkage upon molding even if the amount of the filler is regulated. In order to avoid such problems, it is extremely advantageous to adopt the insert molding method which is designed so as to insert the polymer composite material (hereinafter will also be referred to as a "second insert material") into a gap between a molded product (hereinafter will also be referred to as a "first insert material") and a mold in which the molded product is placed in such a manner that the gap therebetween is formed in a predetermined thickness, so as to form a final shape of the slide member. In this case, the first insert material may be prepared from the resin compositions by conventional molding methods such as the compression molding method, the transfer molding method or the injection molding method. In molding the slide member in a desired final shape, any method may be utilized although the insert molding method is preferred. For example, it is also possible to integrally mold the second insert material and the molded product into a desired final shape of the slide member.

In utilizing the insert molding method, it is preferred to use the polymer composite materials as hereinbefore mentioned for the molded product to be placed or inserted into the mold. In this case, a polymer composite material having properties similar or equivalent to the first insert material may be preferably employed as the second insert material, whereby a favorable adhesion therebetween can be achieved with an improved dimensional accuracy. Although it is considered to employ a metal material for the molding of the molded product, a combination of the metal material with the polymer composite material as the second insert material is not so recommendable because a favorable adhesion therebetween may not be provided due to a difference in thermal expansion coefficients therebetween, laborious and high requirements for processing the metal into a desired shape requiring a high dimensional accuracy, a high cost and a low productivity. In instances where a metal such as alpha-iron similar to the material of the mold is employed as the first insert material, there is a risk that the molded product would be removed from the mold because the polymer composite material to be employed as the second insert material has generally a thermal expansion coefficient higher than that of the metal material of the molded product or first insert material. On the other hand, where a metal such as aluminum having a thermal expansion coefficient higher than that of the polymer composite material to be employed as the second insert material is employed, it is undesired because a large amount of shrinkage is occurred so that a dimensional accuracy on the resulting product is impaired.

In instances where conventional glass fiber type BMC materials (unsaturated polyester resin composition) are employed as the first insert material, a variation in dimensional accuracy on the resulting final product may arise because of an anisotropy in thermal expansion coefficient resulting from a variation in thermal expansion coefficients of the BMC material due to the orientation of the glass fibers. In this case, where the injection molding method is employed for the molding of the first insert material, an injury or damage on a screw may be caused. The conventional glass fiber type resin compositions are hardly practically adaptable to precision mechanism parts.

In accordance with a preferred embodiment of the present invention, the slide member is formed by placing in a mold a first insert material obtainable by the molding of a BMC material of the low shrinkable unsaturated polyester resin of the glass bead type into a desired shape and then inserting the polymer composite material into a gap between the first insert material and the mold, whereby the first and second insert materials are molded integrally into a desired shape of the slide member.

In preparing the final molded product or slide member comprising the first insert material or inner mold portion and the second insert material or outer mold portion, it is preferred to use the polymer composite materials containing predetermined amounts of the granular inorganic filler for the inner and/or outer mold portions in order to improve a dimensional accuracry and enhance a mechanical strength.

In accordance with the present invention, the gap between the first insert material and the mold into which the second insert material is inserted may be in the range generally from about 0.5 to 3 mm, preferably less than about 1.5 mm because a wider gap may cause a strain. As hereinbefore mentioned, various additives may also be employed with the inorganic filler to provide a desired property such as fire retardancy on the resulting slide member. Where in this case the injection molding method is required to mold into the inner mold portion from a viewpoint of economy or productivity, it is desired to choose the particle sizes of the filler within a scope smaller than about 100 microns by taking into consideration the flow characteristics of a premix which will be described hereinafter.

Figure 2:
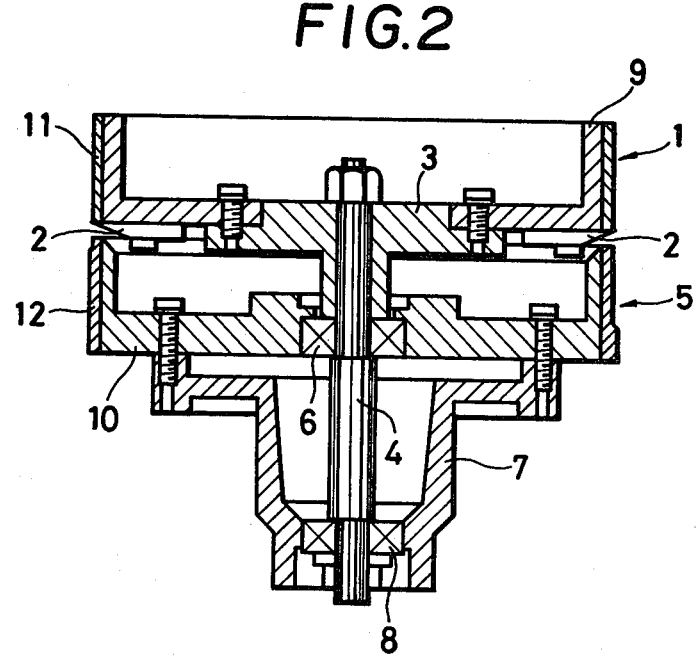
FIG. 2 is a longitudinal cross sectional view illustrating the drum portion of a video tape recorder in which the slide member in accordance with the present invention is employed.

A description will be given of a slide member suitable for the application as a drum element of a video tape recorder having the construction as shown in FIG. 2.

Referring to FIG. 2, a head drum member is seen to comprise a rotary head drum 1 of a cylindrical form and a pair of magnetic heads 2 disposed on the under surface thereof. The magnetic heads 2 are mounted so as to have their tip portions project a little bit from the outer peripheral surface of the head drum which in turn is rotatably fixed through a mounting plate 3 to a shaft 4. The shaft is rotatably supported by a bearing 6 fitted in a cylindrical stationary guide drum 5 disposed under the head drum and by another bearing 8 fitted in a casing 7 supporting the stationary drum and being supported by a chassis (not shown) through a blacket (not shown). The rotary head drum 1 and the stationary guide drum 2 are of a double construction formed by resin molded products. That is, the inner mold portions 9 and 10 may be, for example, of an unsaturated polyester resin composition containing 40 to 65% by volume of glass beads having average particle sizes of 40 microns. The outer mold portions 11 and 12 may be, for example, of an unsaturated polyester resin composition containing from 5 to 15% by volume of graphite and 35 to 55% by volume of glass beads having an average particle size of 40 microns. In this case, it is preferred to provide a thickness of the outer mold portions ranging from approximately 0.5 mm to 3 mm. Where the outer mold portion is too thin, the molding of such thin layer causes difficulty and at the same time a mechanical strength is impaired so that the desired effect cannot be achieved. Where the outer mold portion is too thick, a dimensional accuracy on the final molded product is impaired.

The slide member in accordance with the present invention can maintain a favorably high dimensional accuracy upon molding because there is no directional property in the thermal expansion coefficient of the resin composition due to the use of the spherical fillers, as opposed to the conventional composite materials of the glass fiber type. It is also to be noted that an injury or damage on the tape running the surface of the slide member can be remarkably diminished because graphite and the granular filler are employed with the resin for the outer mold portions, as opposed to the conventional slide members in which glass fibers are employed.

As have hereinabove been mentioned, the formation of the outer mold portions 11 and 12 may be carried out preferably by means of the insert molding method. This method involves placing the first insert material or inner mold portion in a mold so as to give a gap ranging from about 0.5 mm to 3 mm and inserting the polymer composite material into the gap so as to form a final shape of the slide member. It is also possible to pre-coat a predetermined thickness of a layer of the polymer composite material on the first insert material, for example, by means of the insert molding method or any other suitable means and then form additional coating or coatings of the polymer composite materials by means of the aforesaid insert molding method or any other suitable method.

In accordance with another preferred embodiment of the present invention, the contact surface of the slide member which comes into contact with a magnetic tape rolling and running around thereon is treated in a manner as will be described in detail hereinafter, in order to further reduce a friction coefficient between the slide member and the magnetic tape and consequently improve tape travelling properties of the slide member. To this end, an outermost skin or surface layer formed in the outer mold portions of the slide member may be removed.

The methods of removing the outermost skin layer may be illustrated as follows:

(a) manual lapping of the wet or dry type with suitable abrasive material such as $Al_2O_3$, SiC or the like;

(b) cutting with a lathe;

(c) travelling a lapping tape containing $Al_2O_3$, $Cr_2O_3$, $Cr_2O_3$/gamma-$Fe_2O_3$ or the like;

(d) rotating the slide member in a suspension containing the abrasive material such as $Al_2O_3$, SiC or the like (hereinafter also referred to as a "mechanical abrasion method"); and (e) rolling the slide member on a hot metal plate such as an iron plate (hereinafter also referred to as a "thermal decomposition method").

The method as described in item (a) above involves removing the thin skin layer by manually abrading or lapping the surface of a slide member with a suitable abrasive agent such as $Al_2O_3$ particles, SiC particles or the like under suitable conditions, whether dry or wet. This manual method, however, presents the difficulty that a uniform removal of the thin surface layer cannot be effected and encounters with a risk that the skin layer leaves partially unremoved. Accordingly, it is hard to ensure a desired dimensional accuracy required for the slide member requiring a very high dimensional accuracy so that it is inappropriate to use this method for the abrasion of such slide member. It is however noted that this method can be employed for the processing of the slide member applicable to parts failing to require such a high dimensional accuracy.

In the method as described in item (b) above, the thin surface layer may be removed by cutting the surface layer of the slide member with a lathe. In this case, it is difficult to ensure a uniform removal of the surface layer as in the manner as described in item (a) above so that it is inappropriate to use this method for the slide member requiring a high dimensional accuracy. This method, however, can provide a dimensional accuracy higher than in the manual method as in item (a) above so that it can be adopted to form a slide member in accordance with purposes therefor.

The method as described in item (c) above involves rubbing the surface of the slide member with a lapping tape comprising an abrasive material such as $Al_2O_3$, $Cr_2O_3$, $Cr_2O_3$/gamma-$Fe_2O_3$ or the like, whereby the surface layer can be removed. Although this method is practically applicable, there is still the difficulty that the surface layer is removed efficiently.

Figure 3:
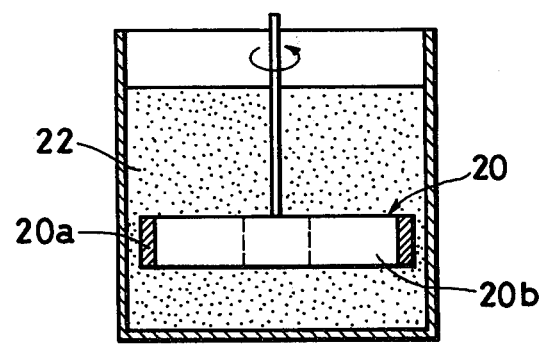
FIG. 3 is a cross sectional view illustrating a brief procedure for the mechanical abrasion method to be employed for the present invention.

In the mechanical abrasion method as described in item (d) above, the surface layer may be removed by rotating the slide member in a suspension of the abrasive material such as $Al_2O_3$ or SiC, by virtue of the friction of the slide member with the abrasive material. As shown in FIG. 3, a molded body 20 is stirred or rotated in the suspension 22 containing the aforesaid abrasive material, whereby the surface layer 20a (FIG. 1) is removed over a whole surface area from the molded body so as to expose part of the surfaces of granular inorganic fillers contained in the inner layer 20b. The abrasive material may have an average particle size ranging generally from about 100 to 1,000 mesh, preferably from about 200 to 600 mesh. Where the particle size is too large, on the one hand, the surface of the finished product is rendered so rough and irregular that a desired low friction coefficient may not be given. The abrasive materials having too large particle sizes may cause the difficulty that it will sediment in the suspension thereof so that a uniform abrasion cannot be achieved and consequently the effect of abrading the surface of the slide member may be diminished. Where the particle size of the abrasive material is too small, on the other hand, a longer time for abrasion is required so that the use of such abrasive materials may not be practical and economical. A liquid in which the abrasive material is suspended may not be restricted to a particular one and may be any liquid which does not exert any adverse influence particularly on the resin components of the polymer composite material. As the polymer composite materials such as BMC material is usually thermally cured, they are usually resistant to suspension liquid so that any such liquid may be employed without causing difficulties. As particles of the abrasive material should be unlikely to sediment in the suspension liquid, it is preferred that the suspension liquid has a certain degree of viscosity so that it is suitable to employ silicone oil or any other suitable liquid. A time required for abrading the surface of the molded product by the mechanical abrasion method as described in item (d) above may vary with the surface material of the molded product to be processed, that is, the kind and nature of resin components constituting the surface layer and the abrasive material, and may not be restricted to any particular one. By determining the kind and nature thereof, a time required for the abrasion of the surface layer from the slide member may be appropriately chosen.

Figure 4:
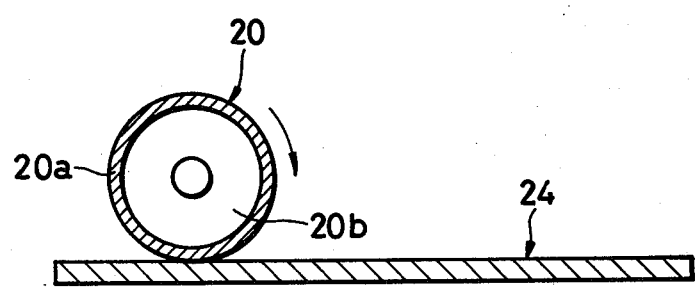
FIG. 4 is a cross sectional view illustrating another procedure to be employed for the present invention.

In the thermal decomposition method as described in item (e) above, the surface layer may be removed by thermally treating the surface of the slide member by heating means having a temperature higher than the temperature at which the resin layer constituting the surface layer of the molded product is thermally decomposed. More specifically, as shown in FIG. 4, a heating means 24 comprising a metal plate or a hot metal roll of iron, aluminum or the like is transferred or travelled while being in contact with the molded product at a predetermined temperature on the surface of the molded product 20 to be processed, whereby the surface layer 20a is removed and part of the granular inorganic filler contained in the inner layer 20b is exposed over substantially a whole surface area of the molded product. In this case, where the molded product is moved relative to the heating means at a suitable speed while in contact with each other, the surface layer can be advantageously removed without causing the decomposition of the inner layer of the molded product to be processed. It is also possible without any difficulty to move either of the molded product or the heating means by regulating the temperature of the heating means to an appropriate degree. The number of travelling the heating means on the molded product may vary with the temperature and the kind of the surface material of the molded product. If a desired thickness of the surface of the molded product can be removed on a one-way travel, it is of course satisfactory to travel or run once. Where a desired thickness of the surface layer cannot be removed by one run, a plurality of runnings should be made until part of the inorganic filler is exposed to a desired extent. In order to remove a uniform thickness of the surface layer, it is advantageous to repeat the running procedures and to remove the surface layer stepwisely. It is also preferred to maintain surface temperatures over the whole surface of the heating means in a uniform manner. Otherwise, a uniform removal of the surface layer is difficult. The surface temperature on the heating means may vary with the kind of the surface material of the molded product to be processed and may be such that the surface layer is thermally decomposed in such a manner that no inner layer is caused to thermally decompose. The surface temperature may be in the range generally from about 250° C. to 600° C. It is a matter of course that, where the surface temperature is too low, the thermal decompositon of the surface layer is not caused to a sufficient extent and the surface layer cannot be removed in a sufficient manner and that, where the surface temperature is too high, there is a risk that the inner layer may also be thermally decomposed and a regulation of the temperature below such temperatures as causing no thermal decomposition on the inner layer renders the operation laborious and the processed surface rough, and a dimensional accuracy on the resulting slide member is adversely affected thereby.

In accordance with the present invention, the methods as described in items (d) and (e) are preferred for the preparation of the slide member. Where the method (d) is employed in a combination with the method (e), it is particularly effective to remove the surface layer from the molded product and can provide a surface roughness of about 1 micron. In this case, either one can be performed prior to the other.

As have hereinbefore been mentioned, the slide member in accordance with the present invention has a low friction coefficient because the surface layer is removed therefrom so that the tape travelling properties are improved to a remarkably great extent. Furthermore, as the slide member in accordance therewith has a finished surface area comprising the polymer composite material such as BMC material, as set forth hereinabove, it can satisfy a wide range of requirements for the slide member requiring a high dimensional accuracy, such as abrasion characteristics, antistatic performance, thermal expansion, dimensional accuracy and so on.

The present invention will be described by way of examples.

EXAMPLE 1

A premix having the following composition was prepared by mixing the following raw materials:

| Composition | Amount |
| --- | --- |
| Styrene solution of an unsaturated polyester resin (Trade name "Polymal 9607"; Takeda Chemical Ind. Co., Ltd.; 34% by weight of styrene) | 600 ml |
| Styrene solution of an acryl resin (Trade name "Polymal 9761"; Takeda Chemical Ind. Co., Ltd.; 67% by weight of styrene) | 400 ml |
| Glass beads (average particle size, 40 microns) | 1,500 ml |
| Zinc stearate (releasing agent) | 40 grams |
| tert.-butyl peroxybenzoate (polymerization initiator) | 10 grams |

The premix was formed in a mold at 150° C. under a pressure of 50 kg/cm$^2$ into a molded product to be used as a first insert material or inner mold portion.

The molded product was measured for its thermal expansion coefficients in the compression direction and in two directions orthogonal to the compression direction. The respective thermal expansion coefficients were found in each case to be 18.5±0.5 ppm/°C. Thus, it was found that the molded product did not show any anisotropy in the three directions.

Figure 8:
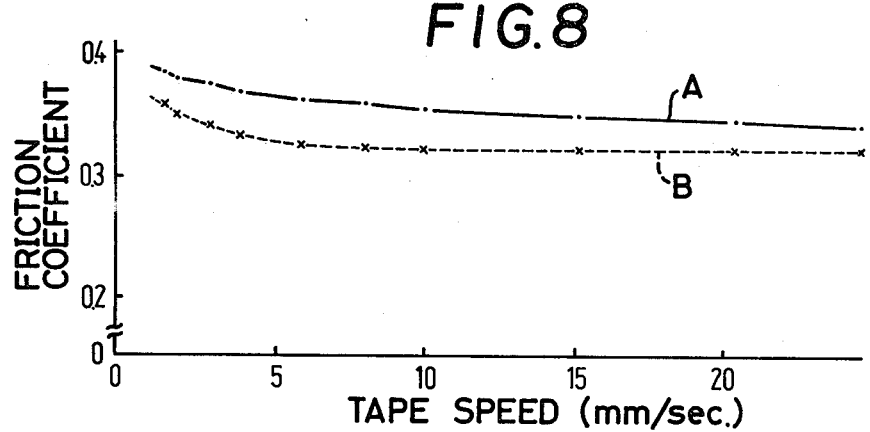
FIGS. 8 through 13 and 15 are graphs illustrating the relationship of the friction coefficients with the tape speeds.

The molded product made one revolution in contact with a stainless steel plate having a surface temperature of 360° C., and this operation was repeated 10 times to give a desired slide member. It was found that part of surfaces of glass beads is exposed uniformly over a substantially whole surface area, and the resulting slide member was measured for its friction coefficient against a usual magnetic tape. The result is shown as curved solid lines A in FIG. 8.

COMPARATIVE EXAMPLE 1

Figure 5:
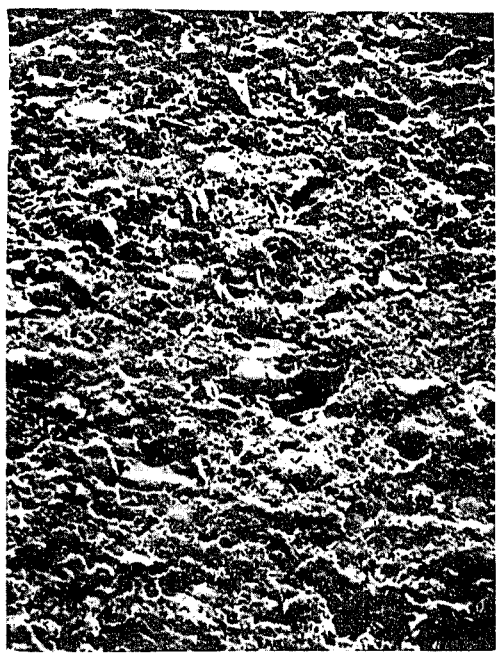
FIG. 5 is a micrograph illustrating the surface of the prior art slide member the surface of which is not abraded.
Figure 6:
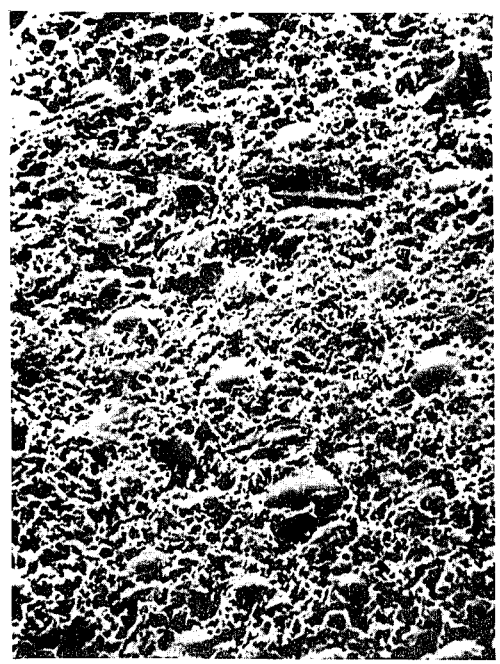
FIGS. 6 and 7 are micrographs illustrating the surfaces of the slide members according to the present invention.

The molded product having still the surface layer prepared in Example 1 was measured for comparative purposes for its surface condition when observed by a microscope and for its friction coefficient. The surface condition of the slide member is shown on a micrograph (×1,000, 45° inclination) as illustrated in FIG. 5. Concerning the friction coefficient, the measurement was impossible because the tape stuck on the surface of the slide member.

EXAMPLE 2

The molded product of Example 1 having still a surface layer was dipped in a suspension of 240 mesh SiC particles in silicone oil and subjected to the mechanical abrasion method for 2 hours. The resulting slide member was observed by a microscope for its surface condition and measured for its friction coefficient. The surface condition is shown in a micrograph (×1,000, 45° inclination), and the friction coefficient is illustrated as curved dash lines B in FIG. 8.

EXAMPLES 3–5

Figure 9:
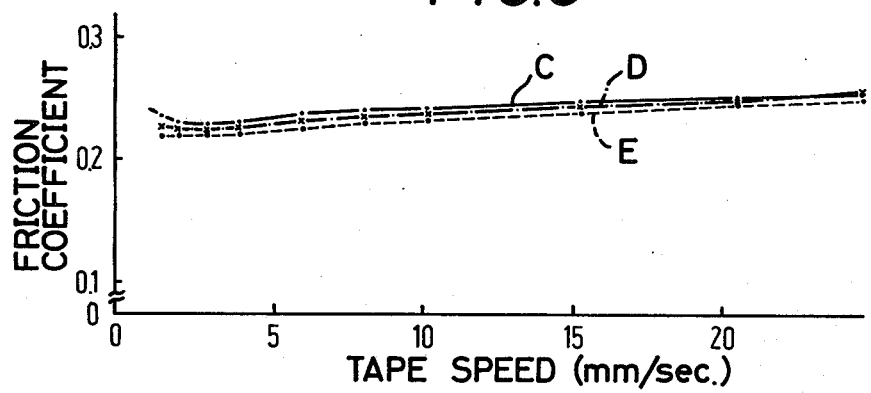

The molded product produced in Example 1 was subjected to abrasion treatments as follows:

In Example 3, the molded product made one revolution on a stainless steel plate having a surface temperature of 380° C., and this operation was repeated five times to thereby remove the surface layer. The friction coefficient is shown as curved solid lines C in FIG. 9.

In Example 4, the operation of Example 3 was repeated ten times. The friction coefficient is shown as curved dot-dash lines D in FIG. 9.

In Example 5, the slide member of Example 4 was further subjected to treatment in a silicone oil suspension of 240 mesh SiC particles for 2 hours. The friction coefficient of the resultant slide member is shown as curved dash lines E in FIG. 9.

EXAMPLES 6-8

Figure 10:
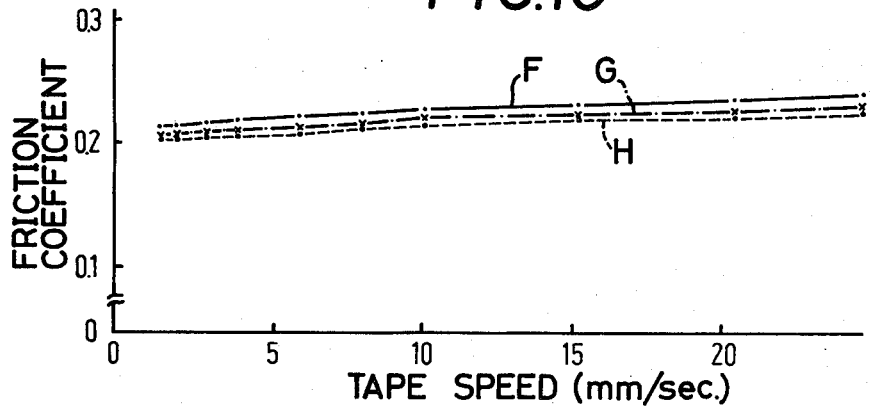

The molded product produced in Example 1 was subjected to abrasion treatments as follows:

In Example 6, the molded product made one revolution on a stainless steel plate having a surface temperature of 240° C., and this operation was repeated five times to give a desired slide member. The friction coefficient is shown as solid lines F in FIG. 10.

In Example 7, the operation of Example 6 was repeated ten times. The friction coefficient is shown as dot-dash lines G in FIG. 10.

Figure 7:

In Example 8, the molded product produced in Example 7 was further treated in the same manner as in Example 5. The surface condition is shown as a micrograph ($\times 1,000$, 45° inclination) in FIG. 7. The friction coefficient is shown as dot lines H in FIG. 10.

EXAMPLE 9

A premix having the following composition was prepared:

| Composition | Amount |
| --- | --- |
| Styrene solution of an unsaturated polyester resin (trade name "Polymal 9607"; Takeda Chemical Ind. Co., Ltd.; 34% by weight of styrene) | 600 ml |
| Styrene solution of an acryl resin (trade name "Polymal 9761"; Takeda Chemical Ind. Co., Ltd.; 67% by weight of styrene) | 400 ml |
| Zn ferrite (average particle sizes, 3 microns) | 1,250 ml |
| Graphite (average particle size, 44 microns) | 250 ml |
| Zinc stearate | 40 grams |
| tert.-butyl peroxybenzoate | 10 grams |

The premix was formed in a molded product in the same manner as in Example 1.

Figure 11:
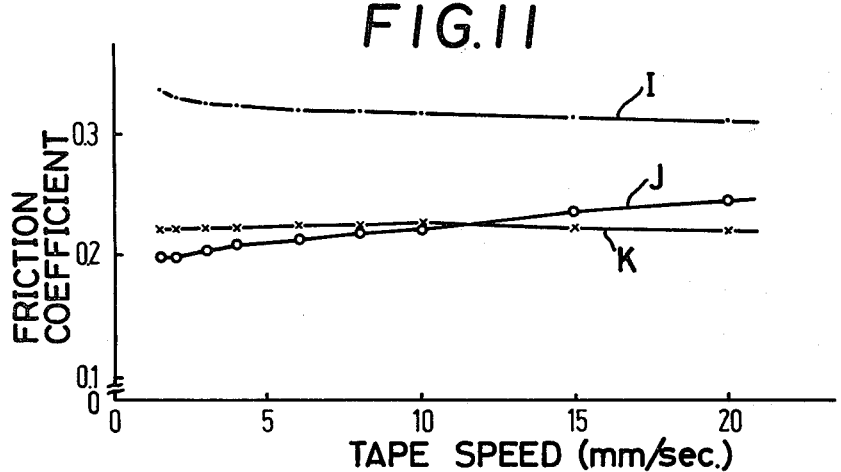

The resultant molded product was surface-treated in a suspension of 400 mesh SiC particles for 4 hours. The friction coefficient of the resultant slide member is shown as solid lines I in FIG. 11.

EXAMPLE 10

The molded product of Example 9 was surface-abraded in a suspension of 400 mesh SiC particles for 8 hours. The friction coefficient is shown as solid line J in FIG. 11.

EXAMPLE 11

The molded product of Example 9 was surface-treated in the same manner as in Example 10 for 12 hours. The friction coefficient is shown as solid line K in FIG. 11.

EXAMPLES 12-14

The molded product of Example 9 was treated in a suspension of 320 mesh SiC particles for 4 hours (Example 12), for 8 hours (Example 13), and for 12 hours (Example 14), respectively.

Figure 12:
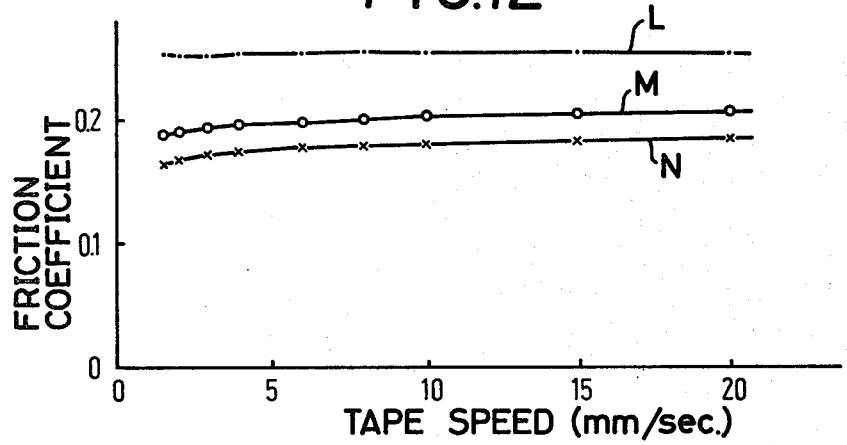

The respective friction coefficients of the resultant slide members are shown as lines L, M, and N in FIG. 12.

EXAMPLES 15-17

The molded product of Example 9 was treated in a suspension of 240 mesh SiC particles for 4 hours (Example 15), for 8 hours (Example 16), and for 12 hours (Example 17).

Figure 13:
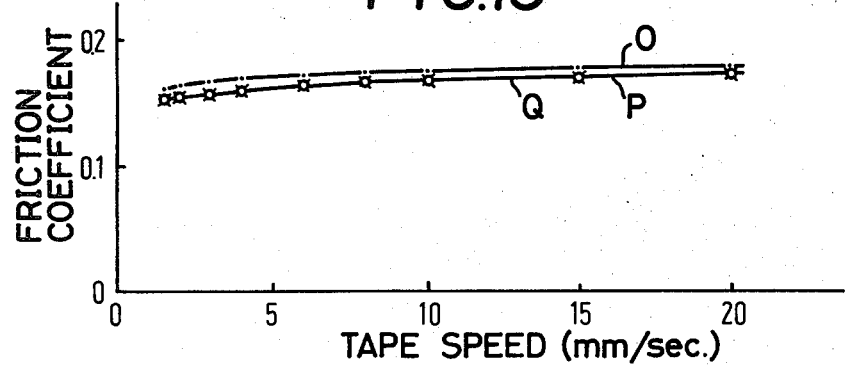

The friction coefficients of the respective slide members are shown as lines 0, P, and Q in FIG. 13.

Figure 14:
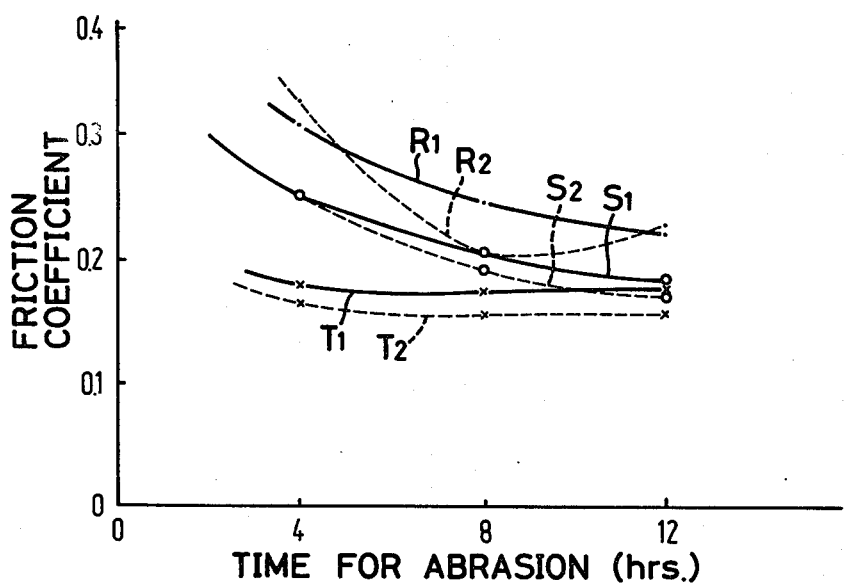
FIG. 14 is a graph illustrating the relationship of the friction coefficient with the time for abrasion.

In FIG. 14, there are shown graphs illustrating the relationships of the time for abrasion with the friction coefficients for the slide members produced in Examples 9 to 17. In the drawing, solid line $R_1$ shows the case where the friction coefficients of the slide members surface-treated in the suspension of 400 mesh SiC particles were measured at the tape speed of 2 mm per second. The dash lines $R_2$ shows the case that the same conditions as in the line $R_1$ were employed with the exception that the tape speed was changed to 20 mm per second. The solid line $S_1$ is the same as in the line $R_1$ except for the use of 320 mesh particles, while the dash lines $S_2$ are the same as in the lines $R_2$ except for the use of 320 mesh particles. The solid line $T_1$ is the same as in the line $R_1$ except for the use of 240 mesh particles, while the dash lines $T_2$ are the same as in the lines $R_2$ except for the use of 240 mesh particles.

COMPARATIVE EXAMPLE 2

The molded product of Example 9 was treated in the same manner as in Examples 9 to 11, respectively. In each case, the friction coefficient was found to be approximately 0.4.

EXAMPLES 18-20

A premix having the following composition was prepared:

| Composition | Amount |
| --- | --- |
| Styrene solution of an unsaturated polyester resin (trade name "Polymal 9607"; Takeda Chemical Ind. Co., Ltd.; 34% by weight of styrene) | 600 ml |
| Styrene solution of an acryl resin trade name "Polymal 9761"; Takeda Chemical Ind. Co., Ltd.; 67% by weight of styrene) | 400 ml |
| Glass beads (average particle size, 40 microns) | 1,000 ml |
| Aluminum hydroxide (average particle sizes, 10-30 microns) | 250 ml |
| Graphite (average particle size, 44 microns) | 250 ml |
| Zinc stearate | 40 grams |
| tert.-butyl peroxybenzoate | 10 grams |

The premix was formed into a molded product in the same manner as in Example 1.

In Example 18, the molded product was treated in the same manner as in Example 9 for 10 hours. The resultant slide member had a friction coefficient as shown as line V in FIG. 15.

In Example 19, the surface treatment was carried out for 20 hours in the same manner as in Example 18. The friction coefficient is shown as line W in FIG. 15.

In Example 20, the molded product of Example 18 was surface treated by manually lapping the surface thereof. The friction coefficient of the resultant slide member is shown as lines X in FIG. 15.

COMPARATIVE EXAMPLE 3

The molded product of Example 18 was measured for its friction coefficient without carrying out the surface treatment. The friction coefficient is shown as line U in FIG. 15.

Figure 15:
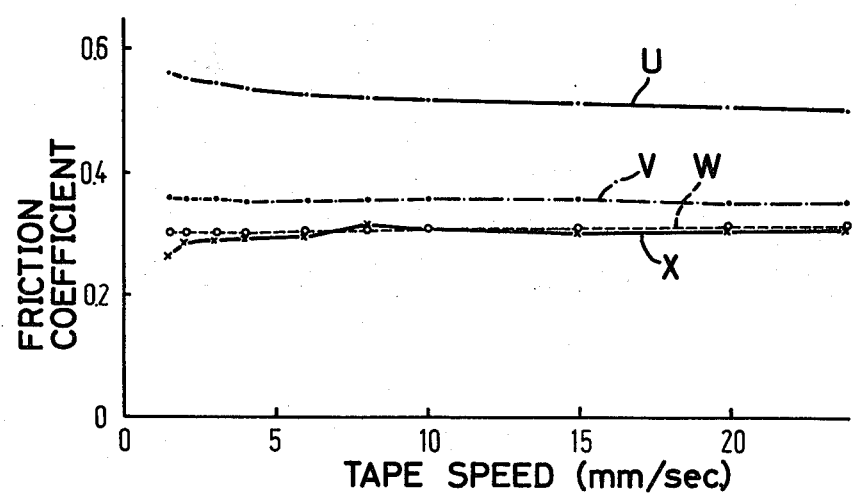

It is apparent from the results as shown in FIG. 15 that the surface treatments in accordance with the present invention permit a remarkably low friction coefficient on the surface of the resulting slide member. The manual lapping treatment can also reduce a friction coefficient, although there is a variation in friction coefficients on the slide member surfaces.

What is claimed is:

1. A slide member having at least one surface against which a traveling magnetic record member is arranged to contact, said slide member comprising a molded polymer composite material composed predominantly of a resinous composition and a granular inorganic filler material dispersed in said resinous composition, said resinous composition containing about 20 to 70% by volume of an unsaturated polyester resin, about 1 to 25% by volume of a thermoplastic resin, and 30 to 70% by volume of a liquid monomer being capable of polymerizing with said unsaturated polyester resin, said granular inorganic filler material having a particle size ranging from 1 to 100 microns and being present in said polymer composite material in an amount of from 40 to 65% by volume for 100% by volume of said resinous composition, said slide member having a surface layer thereof removed so as to expose part of the surface of said granular inorganic filler material.

2. The slide member according to claim 1 wherein the unsaturated polyester resin is an unsaturated linear polyester.

3. The slide member according to claim 2 wherein the unsaturated polyester is of a three-component system.

4. The slide member according to claim 1 wherein the thermoplastic resin is a derivative from a compound having a polymerizable reactive group represented by the moiety: $CH_2=C=$.

5. The slide member according to claim 4 wherein the thermoplastic resin has a molecular weight ranging from approximately 10,000 to 10,000,000.

6. The slide member according to claim 1 wherein the polymer composite material further contains a polymerization initiator and a releasing agent.

7. The slide member according to claim 1 wherein an element of the slide member on which a magnetic recording medium runs is composed of two portions formed integrally.

* * * * *